United States Patent Office 3,484,843
Patented Dec. 16, 1969

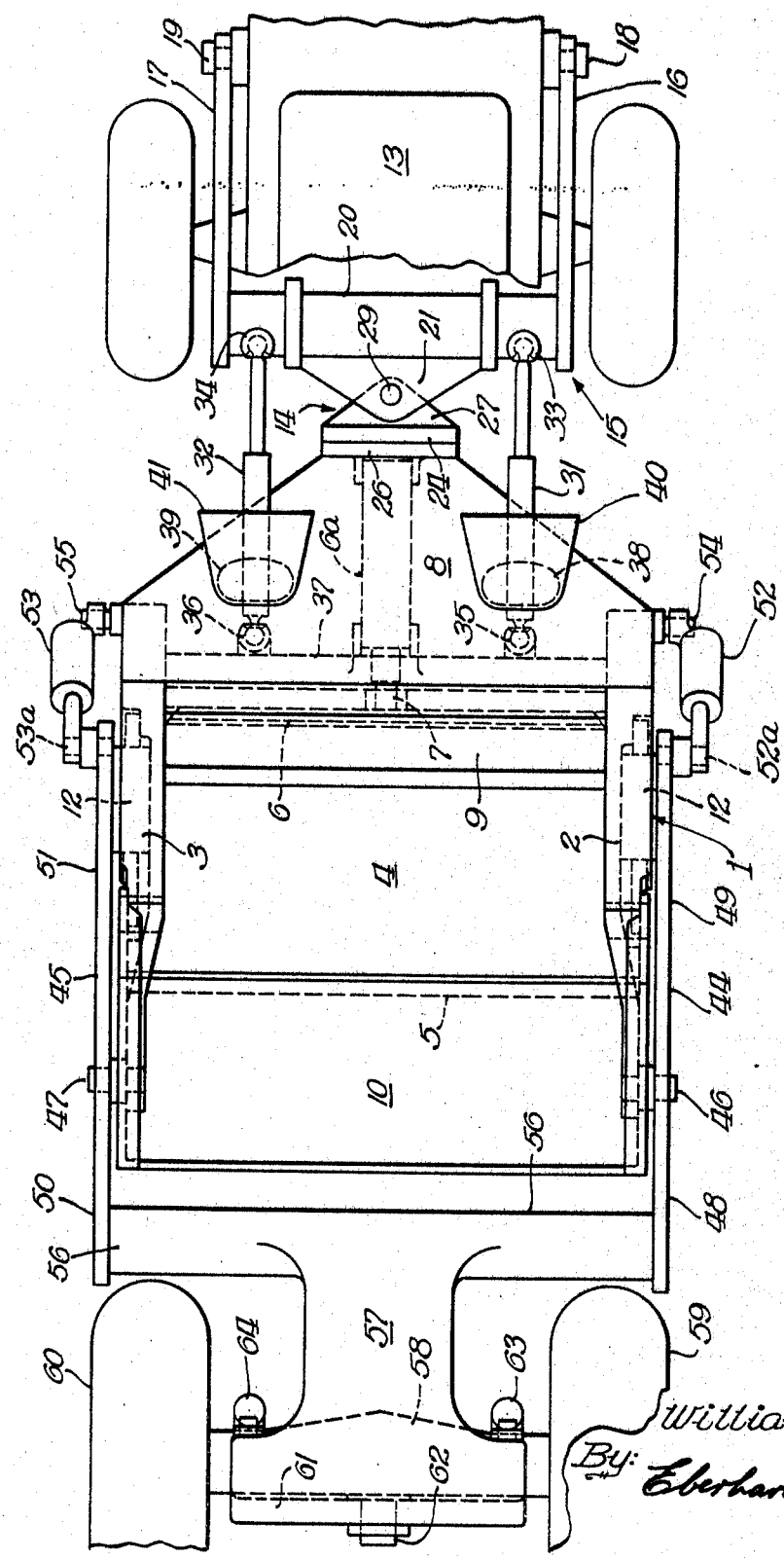

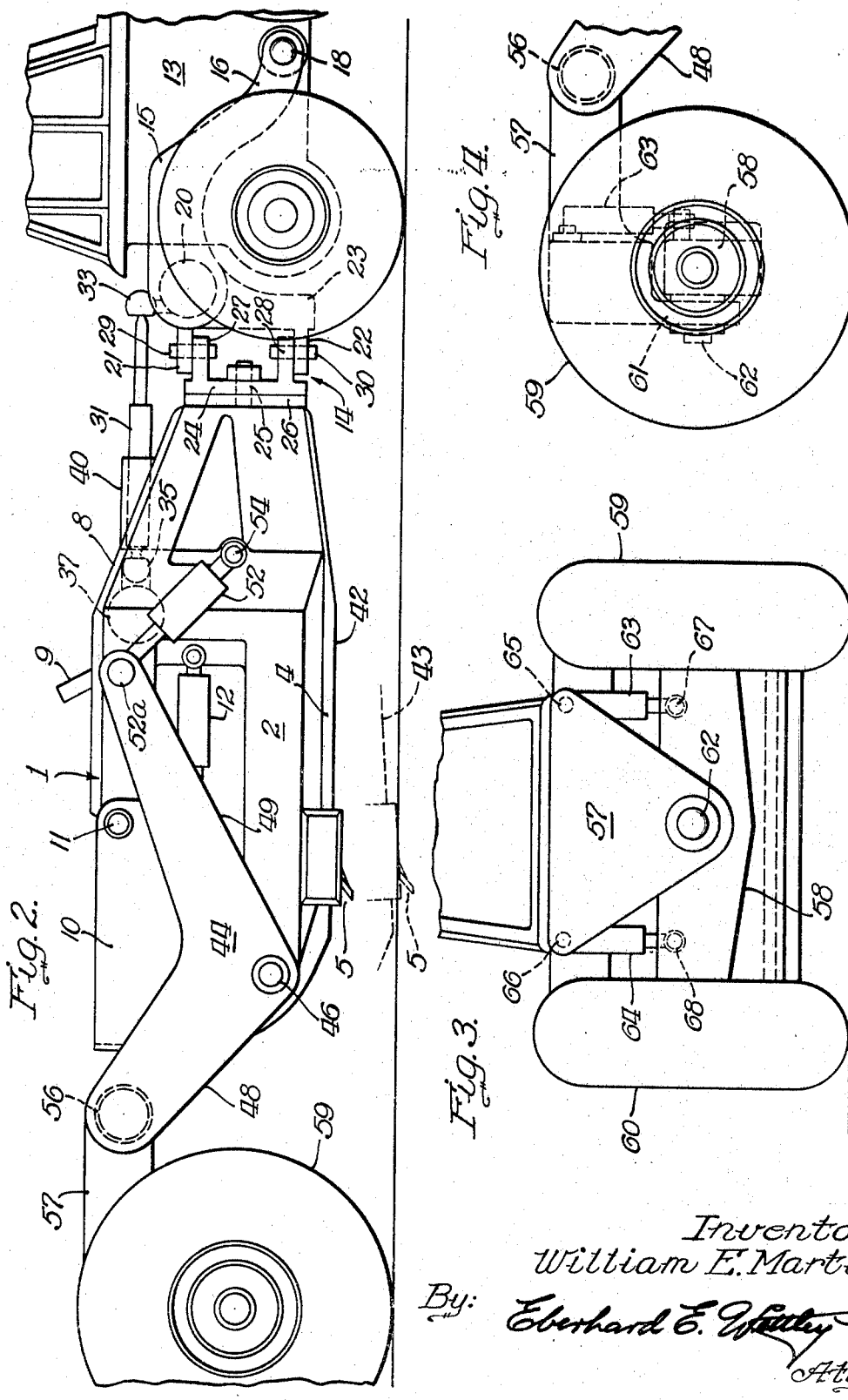

3,484,843
LATERALLY TILTABLE SELF-LOADING MOTOR SCRAPER
William E. Martin, c/o Martin Company, P.O. Box 187, Kewanee, Ill. 61443
Filed Nov. 28, 1967, Ser. No. 686,172
Int. Cl. E02f *3/64;* B62d *5/10;* B60d */02*
U.S. Cl. 37—126                                  6 Claims

ABSTRACT OF THE DISCLOSURE

A self-loading motor scraper having novel mounting arrangements and control mechanisms to adjust the scraper bowl for lateral tilt in relation to the surface being worked and in relation to the power unit provided to maneuver such scraper to thereby angle cut and to remove the surface material as desired and when called for during material handling operations. The scraper is of the pusher type with a universal connection and a power steering mechanism between the pusher vehicle and the scraper bowl.

---

This invention relates to a self-loading motor scraper assembly having one end supported by or mounted upon a companion power vehicle or tractor and the other end of the scraper assembly supported upon wheeled means, which assembly includes operable regulatory means adapted for laterally tilting the scraper assembly in relation to its supported ends and with respect to the surface being worked by this facility.

More specifically, the invention is directed to a large capacity heavy duty scraper providing a wheeled support for the scraper bowl with vertically operable means to adjust the bowl for ground working or for transport and to incorporate rockable apparatus between the scraper bowl and the respective supporting wheel units that carry such scraper bowl, which rockable apparatus functions to tilt the bowl laterally downwardly to either side of the line of travel for angular material penetration and loading of the surface material being worked.

One object of this invention is to provide a heavy duty scraper bowl with raising and lowering means that support such bowl for suitable manipulation between a raised transport position and a lowered earth or material engaging position and to provide operative means to function as tilting instrumentalities to cause the raising and lowering means together with the bowl to inclined downwardly at one side or at the other side of the line of travel of the joined movable bowl supporting wheel means.

Another object is to provide control means to hold the scraper bowl in a tilted chosen working position or raised transport position, which may be a right or left hand bowl disposition, the bowl being vertically operable during any tilted position under operative conditions.

A further object is to provide the tractor or companion power vehicle supported end of the self loading motor scraper with universal coupling apparatus to allow for the lateral tilt function and to also permit shiftable angular steering positions between the power end and wheel guided end of the scraper assembly.

A still further object is to introduce hydraulic cylinder means between the scraper bowl and the scraper hitch means on the power vehicle whereby the longitudinal tracking positions of the mobile power vehicle and the wheeled scraper bowl assembly may be varied and regulated for turning or for other such out of line maneuvers by the described rigs.

Another object is to incorporate a rockable apparatus at the end of the scraper unit which is mounted upon the outboard wheel assembly for lateral tilt to cause bowl tilt and which rockable apparatus incorporates hydraulic mechanism to positively control and to regulate the tilted angularity of the bowl in respect to the surface being worked by such scraper.

All other objects and advantages of the device of the present invention shall hereinafter appear in or become readily evident from the following detailed description having reference to the accompanying drawings providing one exemplary disclosure of an apparatus comprising the herein explained inventive concept.

In the drawings:

FIG. 1 is an exterior plan view of the laterally tiltable self loading motor scraper of the present invention and as the scraper bowl assembly and mobile companion vehicle appear when operating in aligned relation;

FIG. 2 is a side elevational view of the joined units and mechanisms illustrated in FIG. 1, with the bowl of the scraper assembly indicated in a raised transport position;

FIG. 3 is an end elevational view of the motor scraper as viewed from the left in FIG. 2 to show the rockable tilt means at the outboard end of the scraper bowl assembly; and FIG. 4 is another fragmentary end view of the outboard portion of the scraper assembly to better illustrate the rockable means provided at this end of the bowl carrying structure whereby bowl tilt is made possible.

As best shown in FIGS. 1 and 2, the self loading apparatus comprises a large capacity heavy duty scraper bowl 1 with side portions 2 and 3 and a bottom 4 having an earth or material cutting blade 5 at its leading edge. A suitable material ejection blade 6 is actuated by a hydraulic means such as cylinder 6a and its ram 7 suitably mounted under a stone shield deck 8 and baffle means 9; while the open end of the bowl 1 is opened and closed by an apron 10 on pin means 11, the position of the apron 10 being controlled by hydraulic cylinder means 12. It should be understood that the usual hydraulic service lines are provided to activate the cylinders described herein and that valve means are used and positioned for regulation in the cab or driver's location on the power unit or tractor vehicle.

The bowl 1 connects with the power vehicle of mobile unit 13 through a universal mechanism 14 interposed between the bowl structure 1 and a forked hitch means 15. The hitch means 15 comprises drawbar links 16 and 17 pivotally carried on mounting shafts 18 and 19 on vehicle 13, which links include a cross tube 20 that has an upper ear 21 to cooperate with a companion lower ear 22 carried by the depending bracket 23 on cross tube 20. The trailing end of the bowl 1 is provided with a rotatable bearing plate 24 on the pin 25 that is carried in the bowl support plate 26, and bearing plate 24 includes vertically spaced ears 27 and 28 that pivot on aligned pins 29 and 30 connected with the upper and lower ears 21 and 22 of the cross tube structure of the vertically swingable hitch means 15.

While the bowl 1 and vehicle 13 can be maneuvered by the steerable wheels of these units, apparatus is supplied to control the angle of travel between the bowl assembly 1 and vehicle 13, that is, in the tracking relation to each other. Such apparatus comprises a pair of laterally spaced hydraulic cylinders 31 and 32 that have swivel or universal connections at 33 and 34 on cross tube 20 and further universal or swivel connections at 35 and 36 with a cross tube or structural part 37 providing a rigid bowl member. The hydraulic cylinders 31 and 32 extend through suitable clearance openings 38 and 39 in stone deck 8 and other shielding hoods 40 and 41 are provided at the entry locations of the described cylinders.

The bowl 1 raising and lowering mechanisms to swing the bowl from a full line transport position indicated by 42 to a working position shown in broken lines at 43 comprise mainly the bell crank side arms 44 and 45 pivoted on bearing means or shafts 46 and 47 mounted on the bowl side portions 2 and 3. Bell crank arms 44 and 45 have joined legs 48 and 49 on one side of the bowl with joined legs 50 and 51 on the opposite side of the bowl and power cylinders 52 and 53 connect at 52a and 53a with legs 49 and 51 while being mounted on support pins 54 and 55 on the opposite bowl sides 2 and 3 respectively.

The outboard ends of the legs 48 and 50 are rigidly connected by cross tube 56 integral with a bolster 57 that overhangs the axle structure 58 of the wheels 59 and 60. A dependent support bracket 61 is part of the bolster 57 and this bracket 61 is rockably mounted on the trunnion or stub shaft 62 that is connected with the axle structure 58 of wheels 59 and 60 all best illustrated in FIGS. 3 and 4.

Spaced regulatory power means control the entire scraper assembly and bowl 1 as to angularity with respect to the surface being worked as also made possible through the universal mechanism 14 that was previously described.

Such spaced regulatory power means comprise a pair of double acting hydraulic power cylinders 63 and 64 that are pivotally joined at 65 and 66 with pins on bolster 57 and pivotally joined at 67 and 68 with pins carried by the axle structure 58 so that equal and opposite expansion and contraction of the cylinders 63 and 64 will rock the whole bowl assembly or self loading scraper unit on the axle 58 to cause bowl inclination and the inclination of blade 5 in working the ground as it would be when the bowl is lowered to a position 43.

The raising and lowering of the bowl or scraper assembly proper is done through cylinders 52 and 53 as the latter are expanded or contracted simultaneously all through the bell crank arm means 44 and 45 described which arms have their outboard legs 48 and 50 incorporated as part of bolster 57 and the latter connection with the axle means 58 of the wheels 59 and 60. This action causes the bowl pins 46 and 47 to lift or fall and the bowl 1 with such action by the manipulation of cylinders 52 and 53, the swinging of the bowl assembly also being accomplished through the hitch apparatus described which is carried on opposite sides of the power unit or vehicle and through the instrumentality of the universal mechanism 14 hereinbefore described.

In the operation of the scraper assembly 1 it is possible to hold the bowl and blade level for material gathering or working and if desired or needed by conditions of operation, the entire self loading scraper can be inclined laterally in relation to its wheeled supporting means to angle cut the surface being worked. The bowl can be raised or lowered whether level or inclined. The tracking alignment of the two mobile units can also be changed as described regardless of the bodily attitude of the bowl and scraper assembly.

This described construction provides a self loading motor scraper having means that enhances the effective use and operation of such a large capacity earth moving vehicle to carry out functions not normally possible with devices of the kind that are in present day use.

The foregoing specification has been directed to a certain preferred construction to characterize and to illustrate the present invention by way of example and not by way of limitation. Changes in the combinations shown or in the respective individual salient elements of the invention are contemplated without departure from the fundamental concept herein described and disclosed.

What I claim is:

1. In a self-loading motor scraper supported by and operably workable between fore and aft wheel means, one of said wheel means providing a power vehicle adapted to maneuver said scraper together with the other of said wheel means through said scraper, the combination of a material carrying scraper bowl, a hitch support structure to connect one portion of said bowl with one of the wheel means for bodily swinging movement toward and away from the surface being worked, said hitch support structure including universal means to permit said scraper bowl to tilt laterally in relation to a horizontal plane, a further bowl support structure to connect another portion of said bowl with the other of said wheel means including means arranged to accommodate the lateral tilt of said scraper bowl with respect to the other of said wheel means about the axis of travel, regulatory power means disposed between one of said support structures and said wheel means associated therewith whereby the lateral tilt of the bowl may be controlled to angle out the surface being worked, one of said scraper bowl support structures including bell crank means, pivoted on the bowl adjacent the crank apex, having one crank end extending to the wheel means connected with said latter one of the support structures, and power means connected with said bowl and with the other crank end to actuate said bell crank means to raise and lower the scraper bowl.

2. In the combination of claim 1, wherein said regulatory means comprise laterally spaced hydraulic cylinders located at opposite sides of the median center line of the bowl and having connection with transversely spaced portions of said one support structure and with transversely spaced portions of the wheel means of said one structure aforesaid.

3. In the combination set forth and defined in claim 1, wherein said hitch means support structure provides the sole supporting instrumentality extending between the universal means on said structure and the adjacent connected wheel means and wherein said hitch means is swingably mounted upon transverse horizontal mounting shafts on such wheel means to permit vertical swinging of said bowl between transport and loading positions and for all tilt adjusted positions of said bowl.

4. In the combination of claim 1 wherein the power vehicle is carried by and driving the aft wheel means to propel the scraper, the path of pushing the fore wheel means being through the bowl.

5. In a self-loading motor scraper supported by and operably workable between fore and aft wheel means, one of said wheel means providing a power vehicle adapted to maneuver said scraper together with the other of said wheel means through said scraper, the combination of a material carrying scraper bowl, a hitch support structure to connect one portion of said bowl with one of the wheel means for bodily swinging movement toward and away from the surface being worked, said hitch support structure including universal means to permit said scraper bowl to tilt laterally in relation to a horizontal plane, a further bowl support structure to connect another portion of said bowl with the other of said wheel means including a unit arranged to accommodate the lateral tilt of said scraper bowl with respect to the other of said wheel means about the axis of travel; said unit comprising a trunnion carried on the wheel and lying on an axis longitudinally disposed with respect to the bowl, a bolster carried by the trunnion and providing a bracket element pivotally mounted on said trunnion to allow lateral rocking of the bowl with respect to the bolster carrying wheel means, crank arms pivoted on the bowl and connected to the bolster, and power means on said bowl connected with an arm portion of the crank arms to raise and lower said bowl through said bolster and its mounting trunnion, and regulatory power means disposed between one of said support structures and said wheel means associated therewith whereby the lateral tilt of the bowl may be controlled to angle cut the surface being worked.

6. In the combination of claim 5 wherein the power vehicle is carried by and driving the aft wheel means to propel the scraper, the path of pushing the fore wheel means being through the bowl.

References Cited

UNITED STATES PATENTS

| | | | |
|---|---|---|---|
| 1,590,582 | 6/1926 | Johnson et al. | 280—492 |
| 2,091,009 | 8/1937 | Osman | 280—492 |
| 3,049,365 | 8/1962 | Kirchler | 280—492 XR |
| 3,059,714 | 10/1962 | Johnson | 280—492 XR |
| 3,096,696 | 7/1963 | Reisser | 180—79.2 XR |
| 3,097,719 | 7/1963 | Rood | 180—79.2 |
| 3,126,653 | 3/1964 | Bourgeous | 37—108 |
| 3,184,867 | 5/1965 | Symmank | 37—103 |
| 3,360,281 | 12/1967 | Allen | 280—492 XR |
| 3,083,479 | 2/1963 | Knight | 37—126 |

ROBERT E. PULFREY, Primary Examiner

CLIFFORD D. CROWDER, Assistant Examiner

U.S. Cl. X.R.

180—79.2; 280—6, 481, 494